United States Patent
Zhang et al.

(10) Patent No.: US 7,308,115 B2
(45) Date of Patent: *Dec. 11, 2007

(54) INCREMENTAL MOTION ESTIMATION THROUGH LOCAL BUNDLE ADJUSTMENT

(75) Inventors: Zhengyou Zhang, Redmond, WA (US); Ying Shan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

This patent is subject to a terminal disclaimer.

(21) Appl. No.: 11/182,629

(22) Filed: Jul. 14, 2005

(65) Prior Publication Data

US 2006/0008121 A1    Jan. 12, 2006

Related U.S. Application Data

(63) Continuation of application No. 09/884,355, filed on Jun. 18, 2001, now Pat. No. 6,996,254.

(51) Int. Cl.
*G06K 9/00* (2006.01)

(52) U.S. Cl. ............... 382/107; 382/103; 382/151; 382/154; 382/291

(58) Field of Classification Search ............... 382/103, 382/107, 151, 154, 291
See application file for complete search history.

(56) References Cited

U.S. PATENT DOCUMENTS 6,668,082 B1 * 12/2003 Davison et al. ............ 382/190

* cited by examiner

*Primary Examiner*—Matthew C. Bella
*Assistant Examiner*—Wes Tucker
(74) *Attorney, Agent, or Firm*—Lyon & Harr, LLP; Richard T. Lyon

(57) ABSTRACT

An incremental motion estimation system and process for estimating the camera pose parameters associated with each image of a long image sequence. Unlike previous approaches, which rely on point matches across three or more views, the present system and process also includes those points shared only by two views. The problem is formulated as a series of localized bundle adjustments in such a way that the estimated camera motions in the whole sequence are consistent with each other. The result of the inclusion of two-view matching points and the localized bundle adjustment approach is more accurate estimates of the camera pose parameters for each image in the sequence than previous incremental techniques, and providing an accuracy approaching that of global bundle adjustment techniques except with processing times about 100 to 700 times faster than the global approaches.

3 Claims, 11 Drawing Sheets

|   | $\bar{\alpha}$ | $\sigma_\alpha$ | $\bar{\bar{r}}\bar{r}$ | $\bar{\bar{t}}\bar{t}$ | $\sigma_t$ |
|---|---|---|---|---|---|
| O | 12.510 | 0.384 | -0.008, 0.999, 0.052 | 1.030, 0.002, 0.099 | 1.63e-3, 1.18e-2, 2.82e-2 |
| B | 12.253 | 0.228 | 0.001, 0.999, 0.054 | 1.021, -0.005, 0.093 | 4.06e-3, 1.17e-2, 1.59e-2 |
| I | 12.072 | 0.886 | -0.017, 0.998, 0.065 | 1.012, 0.008, 0.095 | 8.29e-3, 1.97e-2, 7.46e-2 |
| II | 12.621 | 0.981 | -0.004, 0.999, 0.048 | 1.002, 0.000, 0.097 | 8.31e-3, 1.43e-2, 9.24e-2 |

FIG. 5

|  | I | II | O | B |
|---|---|---|---|---|
| STN31 12.41 | 0.412 1.219 | 2.715 30.64 | 0.323 2.578 | 0.306 476.038 |
| STN61 6.21 | 0.389 3.797 | 2.877 67.076 | 0.354 5.250 | 0.321 3739.193 |
| DYN40 2.89 | - - | - - | 1.149 2.07 | 0.673 1250.163 |
| FRG21 11.94 | 0.372 0.907 | 31.003 25.922 | 0.362 2.56 | 0.345 240.414 |

FIG. 10

INCREMENTAL MOTION ESTIMATION THROUGH LOCAL BUNDLE ADJUSTMENT

CROSS-REFERENCE TO RELATED APPLICATIONS:

This application is a continuation of a prior application entitled "INCREMENTAL MOTION ESTIMATION THROUGH LOCAL BUNDLE ADJUSTMENT" which was assigned Ser. No. 09/884,355 and filed Jun. 18, 2001 now U.S. Pat. No. 6,996,254.

BACKGROUND

1. Technical Field

The invention is related to incremental motion estimation techniques, and more particularly to an incremental motion estimation system and process for estimating the camera pose parameters associated with each image of a long image sequence using a local bundle adjustment approach.

2. Background Art

Estimating motion and structure of an object from long image sequences depicting the object has been a topic of interest in the computer vision and the computer graphics fields for some time. For example, determining the motion and structure of objects depicted in a video of a scene containing the objects is of particular interest. The estimates are used for a variety of applications. For example, estimates of the structure of an object depicted in the consecutive images can be used to generating a 3D model of an object. Estimating the motion of an object in an image sequence is useful in background/foreground segmentation and video compression, as well as many other applications. A key part of estimating motion and structure from a series of images involves ascertaining the camera pose parameters associated with each image in the sequence. The optimal way to recover the camera pose parameters from long image sequences is through the use of a global bundle adjustment process. Essentially, global bundle adjustment techniques attempt to simultaneously adjust the camera pose parameters associated with all the images such that the predicted 3D location of a point depicted in multiple images coincides. This typically involves the minimization of re-projection errors. However, bundle adjustment does not give a direct solution, rather it is a refining process and requires a good starting point. This starting point is often obtained using conventional incremental approaches. In general, incremental approaches attempt to estimate the camera pose parameters of an image in a sequence using the parameters computed for preceding images.

A good incremental motion estimation process is also very important for applications other than just supplying a good starting point for the global bundle adjustment. For example, in many time-critical applications, such as visual navigation, there simply is not enough time to compute camera pose parameters using global bundle adjustment techniques, which are relatively slow processes. In such cases, the estimation of the camera pose parameters can be achieved using faster incremental approaches, albeit with potentially less accuracy. Additionally, when an image sequence is dominated by short feature tracks (i.e., overlap between successive images is small), the global optimization techniques degenerate into several weakly correlated local processes. In such cases, the aforementioned incremental methods will produce similar results with less processing. Still further, in some computer graphics applications, local consistency is more important than global consistency. For example, due to errors in calibration and feature detection, a global 3D model may not be good enough to render photorealistic images. Approaches such as "view-dependent geometry" which rely on a local 3D model may be preferable. Incremental methods can be employed as part of the process of generating these local 3D models.

There are two main categories of incremental techniques. The first is based on Kalman filtering. Because of the nonlinearity between motion-structure and image features, an extended Kalman filter is typically used. The final result then depends on the order in which the image features are supplied, and the error variance of the estimated motion and structure is usually larger than the bundle adjustment.

The second category is referred to as subsequence concatenation. The present system and process falls into this category. One example of a conventional subsequence concatenation approach is the "threading" operation proposed by Avidan and Shashua in reference [1]. This operation connects two consecutive fundamental matrices using the tri-focal tensor. The threading operation is applied to a sliding window of triplets of images, and the camera matrix of the third view is computed from at least 6 point matches across the three views and the fundamental matrix between the first two views. Because of use of algebraic distances, the estimated motion is not statistically optimal. Fitzgibbon and Zisserman [2] also proposed to use sub-sequences of triplets of images. The difference is that bundle adjustment is conducted for each triplet to estimate the trifocal tensor and successive triplets are stitched together into a whole sequence. A final bundle adjustment can be conducted to improve the result if necessary. Two successive triplets can share zero, one or two images, and the stitching quality depends on the number of common point matches across six, five or four images, respectively. The number of common point matches over a sub-sequence decreases as the length of the sub-sequence increases. This means that the stitching quality is lower when the number of overlapping images is smaller. Furthermore, with two overlapping images, there will be two inconsistent camera motion estimates between the two images, and it is necessary to employ an additional nonlinear minimization procedure to maximize the camera consistency. It is also noted that both of the subsequence concatenation processes described above rely on point matches across three or more views. Point matches between two views, although more common, are ignored.

It is noted that in this background section and in the remainder of the specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward an incremental motion estimation system and process that uses a sliding window of triplets of images, but unlike other subsequence concatenation processes, also takes into account those points that only match across two views. Furthermore, the motion is locally estimated in a statistically optimal way. To this end, a three-view bundle adjustment process is adapted to the incremental estimation problem. This new formulation is referred to as local bundle adjustment. The problem is formulated as a series of local bundle adjustments in such a way that the estimated camera motions in the whole sequence are consistent with each other. Because the present technique makes full use of local image information, it is more accurate than previous incremental techniques. In addition, the present technique is very close to, and considerably faster than, global bundle adjustment. For example, in an experiment with 61 images, a reduction in processing time of almost 700 times was observed while providing nearly the same accuracy.

The present system and process begins by first extracting points of interest from each image in a given image sequence. This essentially involves determining the image coordinates of points associated with one or more objects of interest that are depicted in the image sequence. Any appropriate conventional process can be employed to determine the object point coordinates, such a corner detector. Once the points of interest are identified, point matches between successive images are established. Any appropriate conventional technique can also be employed for this purpose. For example, sequential matchers have proven to be successful. In one embodiment of the present invention, two sets of point matches are gleaned from the point matching process. The first set identifies points that match in location in three successive images, while the second set identifies points that match in location between two successive images. Next, the camera coordinate system associated with the first image in the sequence is chosen to coincide with the world coordinate system. The motion (i.e., camera pose parameters) associated with the second image in the sequence is then computed using any appropriate conventional two-view structure-from-motion technique. This establishes the camera pose parameters (i.e., rotation and translation) of the first and second image with respect to the world coordinate system.

A primary goal of the present system and process is to estimate the unknown camera pose parameters associated with the third image of a triplet of images in the given sequence using the parameters computed for the preceding two images. Thus in the case of the first three images, the camera pose parameters associated with the third image are estimated using the parameters previously computed for the first two images. This process is then repeated for each subsequent image in the sequence using the previously computed camera pose parameters from the preceding two images in the sequence. In this way, the camera pose parameters are estimated for each successive image in the sequence of images. The task of estimating the camera pose parameters associated with the third image in a triplet of images is accomplished using a process that will be described next.

The aforementioned camera pose parameter estimation process according to one embodiment of the present invention involves minimizing the sum of the squared errors between the image coordinates of the identified match points and predicted coordinates for those points considering both the triple match points in a triplet of consecutive images and the dual match points between the latter two images of the triplet. In one embodiment, the predicted image coordinates of a match point are computed as a function of the 3D world coordinate associated with the point under consideration and the camera pose parameters of the image depicting the point. More particularly, the camera pose parameters associated with the third image in a triplet of consecutive images of the given sequence, as well as the 3D world coordinates associated with each triple and dual match point in the triplet, which will result in a minimum value for the sum of the squared differences between the image coordinates of each identified triple match point and its corresponding predicted image coordinates in each of the three images in the triplet, added to the sum of the squared differences between the image coordinates of each identified dual match point and its corresponding predicted image coordinates in each of the latter two images in the triplet, are computed using the previously determined camera pose parameters associated with the first two images in the triplet.

The use of the dual point matches in the foregoing technique provides a more accurate estimate of the camera pose parameters associated with each image in the image sequence than is possible using conventional incremental methods. In addition, the processing time associated with estimating the camera pose parameters of the images in the sequence is orders of magnitude faster than traditional global bundle adjustment techniques, while being nearly as accurate. However, it is possible to speed up the process even further. This is essentially accomplished by eliminating the need to directly estimate the 3D coordinates of the match points, and reducing the problem to one of minimizing just the camera pose parameters. Specifically, instead of estimating the 3D points, their projections into the images are estimated. To this end, the foregoing minimization problem is modified to characterize the predicted match point locations in terms of each other and functions that described the relationship between them. This is accomplished by recognizing each pair of match points in consecutive images must satisfy the epipolar constraint such that their locations are related by the fundamental matrix associated with the images in question. Additionally, in regard to triple match points, it is further recognized that given the image coordinates of the points in the first two images (which will have been computed previously), the location of the corresponding point in the third image can be defined in terms of the camera projection matrices (which contain the camera pose parameters) associated with the triplet of images. Applying these two constraints to the minimization technique described above allows the camera pose parameters associated with the third image in a triplet of consecutive images to be derived directly without having to estimate the 3D locations associated with the match points. This reduces the processing time significantly.

DESCRIPTION OF THE DRAWINGS

The specific features, aspects, and advantages of the present invention will become better understood with regard to the following description, appended claims, and accompanying drawings where:

FIG. 5 is a ground truth comparison table comparing the mean rotation angle ($\bar{\alpha}$) between successive pairs of frames (in degrees), the sample deviation of the rotation angle ($\sigma_\alpha$), the mean rotation axis ($\bar{r}$) in the order of x, y, and z, the mean translation vector ($\bar{t}$), and the square roots of the diagonal elements of the covariance matrix of the translation ($\sigma_t$) that results when various methods are used to estimate the camera pose parameters associated each image of a sequence of images.

FIG. 7A shows a side and top view of the results obtained using a conventional global bundle adjustment technique, and FIG. 7B shows a side and top view of the results obtained using Method O.

FIG. 8A depicts sample images from the input sequence, and FIGS. 8B and 8C each show top and front views of the results obtained using global bundle adjustment and Method O, respectively.

FIG. 9A shows a top view of the results obtained using Method O, and FIG. 9C is a top view of the results obtained using global bundle adjustment. FIG. 9B shows a sample image of the sequence.

FIG. 10 is a table comparing the projection error and running time obtained using various methods (i.e., I, II, O and B) on four sample image sequences (STN31, STN61, DYN40, and FRG21). The projection errors are displayed in the top of each cell of the table. The error used here is the root mean square error in pixels. The running time (in seconds) of each algorithm is displayed under each corresponding projection error. The numbers below the sequence names are the estimated average rotation angle between two successive frames.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
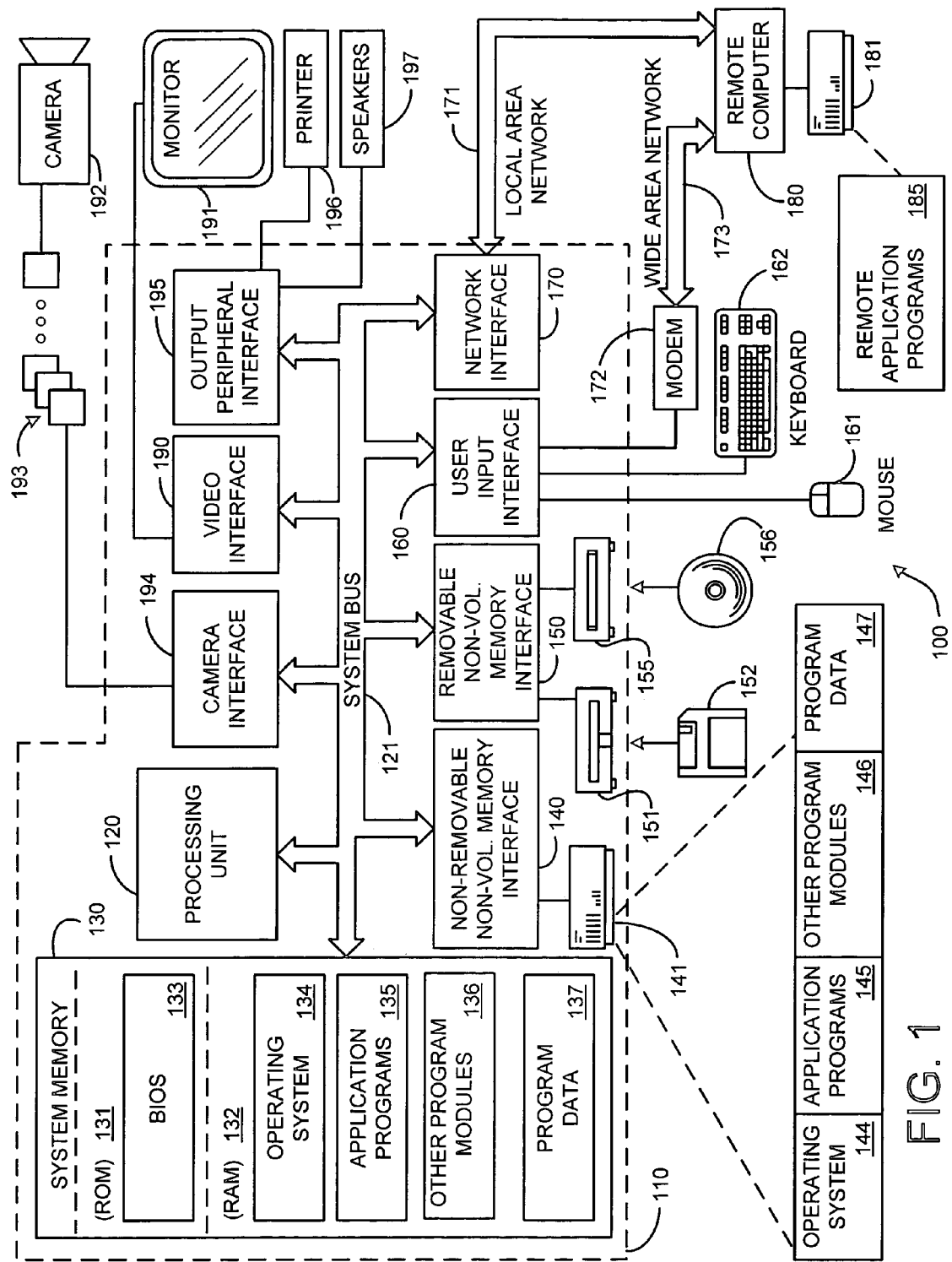
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the program modules embodying the invention.

1. Local Bundle Adjustment

In this section, the notation that will be used to describe the present local bundle adjustment technique will be introduced, and the technique itself will be described.

1.1. Notation

An image point is denoted by $p=[u, v]^T$, and a point in space is denoted by $P=[X, Y, Z]^T$. For homogeneous coordinates, $\tilde{x}=[x^T, 1]^T$ is used for any vector x. Image $I_i$ is taken by a camera with unknown pose parameters $M_i$ which describes the orientation (rotation matrix $R_i$) and position (translation vector $t_i$) of the camera with respect to the world coordinate system in which 3D points are described. The relationship between a 3D point P and its projection $p_i$ in image i is described by a 3×4 projection matrix $P_i$, and is given by $$s\tilde{p}_i = P_i \tilde{P}, \quad (1)$$

where s is a non-zero scale factor. In general, $P_i=A_i[R_i t_i]$, where the 3×3 matrix $A_i$ contains the camera's internal parameters. If the camera is calibrated (i.e., $A_i$ is known), normalized image coordinates are employed and $A_i$ is set to the identity matrix. In the following discussion, it is sometimes more convenient to describe the non-linear projection (Eq. 1) by function $\phi_i$ such that $$p_i = \phi(M_i, P). \quad (2)$$

1.2. Local Bundle Adjustment

Figure 2A:
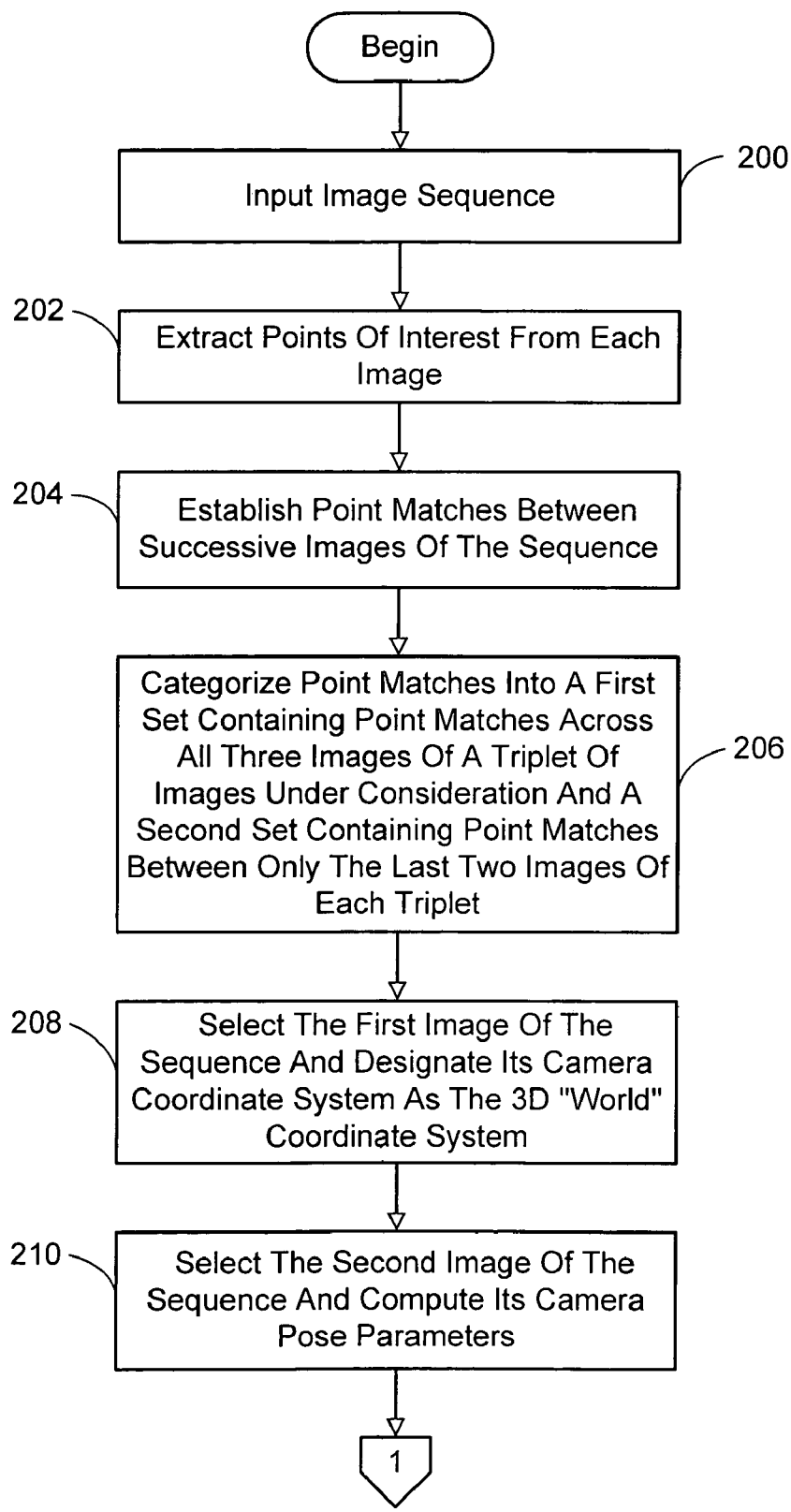
FIGS. 2A and 2B are a flow chart diagramming an overall incremental motion estimation process for estimating the camera pose parameters associated with each image of a long image sequence.
Figure 2B:
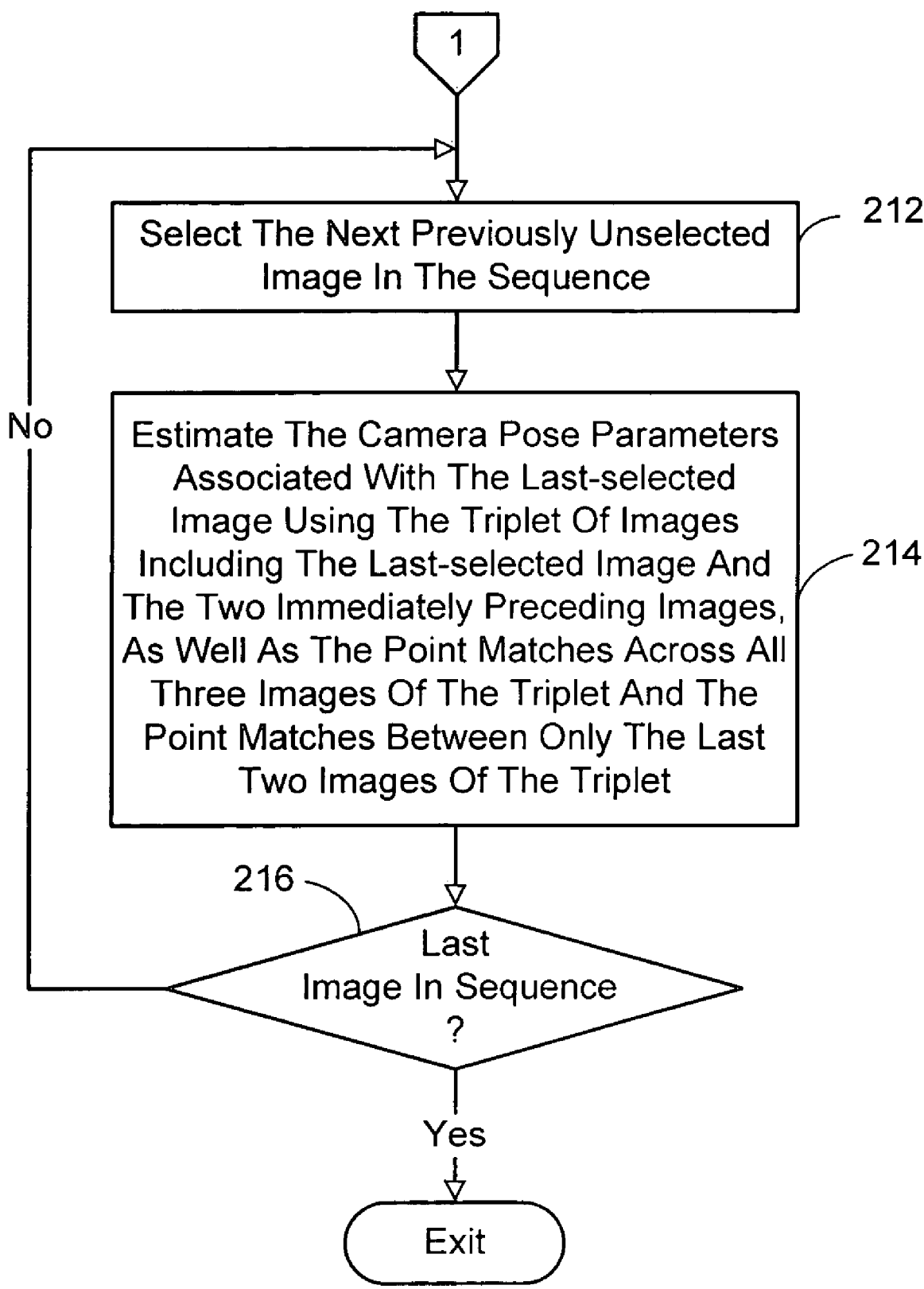

Referring to FIGS. 2A and 2B, the local bundle adjustment technique according to the present invention will now be described. In process action 200, an image sequence $\{I_i | i=0, \ldots, N-1\}$ is input. Points of interest in the sequence are extracted from each image (process action 202). Any appropriate extraction procedure can be employed for this purpose. For example, a Harris' corner detector [3] was used in tested embodiments of the present system and process. Point matches between successive images are then established (process action 204). Any appropriate conventional matching technique can be used. For example, standard sequential matching techniques [4, 5, 6, 7] would be appropriate for use with the present invention. Once the point matches are known, they are separated into two categories (at least in one embodiment of the present invention), as indicated in process action 206. The first category contains point matches across all three views, and the second category contains point matches only between the last two images of the triplet under consideration. The first image $I_0$ in the input sequence is then selected and its camera coordinate system is designated as the 3D "world" coordinate system (process action 208). Thus, $R_0=I$ and $t_0=0$. Next, as indicated by process action 210, the second image (i.e., $I_1$) in the input sequence is selected and a standard two-view structure-from-motion technique, such as one based on minimizing re-projection errors, is used to compute the motion $M_1$ (i.e., camera pose parameters). The next previously unselected image (i.e., $I_i (i \geq 2)$) in the input sequence is then selected (process action 212). The motion $M_i$ associated with the last-selected image is then estimated (process action 214). This is accomplished using the triplet of images including the last-selected image and the two immediately preceding images (i.e., $I_{i-2}, I_{i-1}, I_i$), and the point matches between only the last two images of the triplet as well as the point matches across all three images of the triplet, as will be described in detail shortly. It is next determined if the last-selected image is the last image in the input image sequence (process action 216). If it is the last image, the process ends. However, if there are remaining previously unselected images in the sequence, Process actions 212 through 216 are repeated.

The process by which $M_i$, where $i \geq 2$, is estimated will now be described. To simplify the explanation, only $i=2$ will be considered, however, the result extends naturally to $i>2$. Consider the three views ($I_0, I_1, I_2$). Two sets of point matches have been identified. The first contains point matches across all three views, and is denoted by $\Omega=\{(p_{0,j}, p_{1,j}, p_{2,j})|j=1,\ldots, M\}$. The second contains point matches only between $I_1$ and $I_2$, and is denoted by $\Theta=\{(q_{1,k}, q_{2,k})| k=1, \ldots, N\}$. The camera matrices $P_0$ and $P_1$ (or equivalently $M_0$ and $M_1$) are already known, and the problem is to determine the camera matrix $P_2$ (or equivalently $M_2$).

The objective is to solve for $P_2$ or $M_2$ in an optimal way by minimizing some statistically and/or physically meaningful cost function. A reasonable assumption is that the image points are corrupted by independent and identically distributed Gaussian noise because the points are extracted independently from the images by the same algorithm. In that case, the maximum likelihood estimation is obtained by minimizing the sum of squared errors between the observed image points and the predicted feature points. More formally, the process for estimating $M_2$ according to the present invention is:

$$\min_{M_2, \{P_j\}, \{Q_k\}} \left( \sum_{j=1}^{M} \sum_{i=0}^{2} \|p_{i,j} - \phi(M_i, P_j)\|^2 + \sum_{k=1}^{N} \sum_{i=1}^{2} \|q_{i,k} - \phi(M_i, Q_k)\|^2 \right) \quad (3)$$

where $P_j$ is the 3D point corresponding to triple point match $(p_{0,j}, p_{1,j}, p_{2,j})$ and $Q_k$ is the 3D point corresponding to pair point match $(q_{1,k}, q_{2,k})$. It should be noted that this process advantageously includes point matches shared by two views as well as those across three views to achieve a more accurate estimate than possible with conventional techniques. In addition, this process guarantees that the estimated consecutive camera motions are consistent with a single 3D model defined in the camera coordinate system of the first image of the sequence.

It is noted that in connection with estimating $M_1$ (see process action 210), when the motion between $I_0$ and $I_1$ is small, a standard two-view structure-from-motion technique might result in an inaccurate estimate for the camera pose parameters. In such cases, the pose parameters $M_1$ associated with the second image $I_1$ can be more accurately estimated using a conventional global bundle adjustment procedure performed on the first three images of the sequence $I_0$, $I_1$ and $I_2$, albeit at the cost of a longer processing time.

It is further noted that in cases where one or more of the internal camera parameters, such as for example the focal length, are not known, the foregoing technique can be modified to determine the projection matrix that will provide the minimum difference between the observed match point locations and the predicted locations. The projection matrix includes both the internal and extrinsic parameters, whereas the camera pose parameters only include the rotation and translation coordinates associated with a camera (i.e., the extrinsic parameters). In this way the unknown internal parameters can be determined as well. Even when the internal parameters are known, the projection matrix can be determined in lieu of the camera pose parameters, if desired. However, the elimination of the internal parameters reduces the processing time somewhat.

2. Reducing the Local Bundle Adjustment Processing Time

The minimization process of Eq. 3 is characterized by a large dimensional space, with the number of dimensions being equal to 6+3(M+N). While even with this large dimension space much less processing is required compared to global bundle adjustment procedures, the process could still be made much quicker. One way to speed up the minimization process would be to employ the sparseness of the Jacobian and Hessian structure as described in reference [8]. However, a specialized procedure for speeding up the processing associated with the present local bundle adjustment technique has been developed and will be described next.

The aforementioned procedure involves the use of a first order approximation to eliminate all the unknown structure parameters $\{P_j\}$ and $\{Q_k\}$, thus reducing the local bundle adjustment to a minimization problem over only the camera pose parameters $M_2$ (a six-dimensional space if the camera's internal parameters are known).

Because of independence between the 3D point structures, Eq. (3) is equivalent to $$\min_{M_2}\left(\sum_{j=1}^{M}\min_{P_j}\sum_{i=0}^{2}\|p_{i,j}-\phi(M_i,P_j)\|^2 + \sum_{k=1}^{N}\min_{Q_k}\sum_{i=1}^{2}\|q_{i,k}-\phi(M_i,Q_k)\|^2\right). \quad (4)$$

The above two terms will be considered separately in the sections to follow.

2.1. Two-View and Three-View Geometry

Before describing the process for reducing the local bundle adjustment to a minimization problem over only the camera pose parameters $M_2$, some new notation regarding two-view and three-view geometry must be introduced.

2.1.1. Epipolar constraint. In order for a pair of points ($p_i$, $p_{i+1}$) between $I_i$ and $I_{i+1}$ to be matched (or in other words to correspond to a single point in space), they must satisfy the epipolar constraint:

$$\tilde{p}_{i+1}^T F_{i,i+1} \tilde{p}_i = 0, \quad (5)$$

where the fundamental matrix $F_{i,i+1}$ is given by:

$$F_{i,i+1} = [P_{i+1}c_i]_\times P_{i+1}P_i^+. \quad (6)$$

Here, $c_i$ is a null vector of $P_i$, i.e., $P_i c_i = 0$. Therefore, $c_i$ indicates the position of the optical center of image $I_i$. $P^+$ is the pseudo-inverse of matrix P: $P^+ = P^T(PP^T)^{-1}$. $[x]_\times$ denotes the 3×3 anti-symmetric matrix defined by vector x such that x×y=$[x]_\times$y for any 3D vector y. When the cameras' internal parameters are known, it is possible to work with normalized image coordinates, and the fundamental matrix becomes the essential matrix. Thus, $F_{i,i+1}=[t_{i,i+1}]_\times R_{i,i+1}$, where ($R_{i,i+1}$, $t_{i,i+1}$) is the relative motion between $I_i$ and $I_{i+1}$.

2.1.2. Image point transfer across three views. Given the camera projection matrices $P_i$(i=0, 1, 2) and two points $p_0$ and $p_1$, in the first two images respectively, their corresponding point in the third image, $p_2$, is then determined. This can be seen as follows. Denote their corresponding point in space by P. According to the camera projection model (Eq. 1), $s_0\tilde{p}_0=P_0\tilde{P}$ and $s_1\tilde{p}_1=P_1\tilde{P}$. Eliminating the scale factors yields:

$$[\tilde{p}_0]_\times P_0\tilde{P}=0 \text{ and } [\tilde{p}_1]_\times P_1\tilde{P}=0.$$

It is easy to solve for $\tilde{P}$ from these equations. Then, its projection in $I_2$ is given by $s_2\tilde{p}_2=P_2\tilde{P}$. Combining the above two operations gives the image transfer function which we be denoted by $\psi$, i.e., $$p_2=\psi(p_0, p_1) \quad (7)$$

2.1.3. Additional notation. The following notation is also introduced to facilitate the explanation of the process for reducing the local bundle adjustment to a minimization problem over only the camera pose parameters $M_2$. Specifically, it is noted that:

$$\breve{p}=\begin{bmatrix}p\\0\end{bmatrix} \text{ and } Z=\begin{bmatrix}1 & 0\\0 & 1\\0 & 0\end{bmatrix}. \quad (8)$$

Thus, $\breve{p}=Zp$, $p=Z^T\breve{p}$, $ZZ^T=$diag (1, 1, 0), and $Z^TZ=$diag (1, 1).

2.2. Simplifying the Three-View Cost Function

Consider $$\min_{P_j}\sum_{i=0}^{2}\|p_{i,j}-\phi(M_i,P_j)\|^2 \quad (9)$$

in Eq. (4). To simplify the notation, the subscript j is dropped. Instead of estimating the 3D point, its projections in images is estimated. This is equivalent to estimating $p_i$(i=0, 1, 2) by minimizing the following objective function:

$$\mathcal{J}=\|p_0-\hat{p}_0\|^2+\|p_1-\hat{p}_1\|^2+\|p_2-\hat{p}_2\|^2 \quad (10)$$

subject to (i) $\hat{p}_1^T F_{0,1}\hat{p}_0=0 \quad (11)$ and (ii) $\hat{p}_2=\psi(\hat{p}_0, \hat{p}_1), \quad (12)$ where the fundamental matrix $F_{0,1}$ and the image transfer function $\psi$ are described in Sec. 2.1. By applying the Lagrange multiplier technique, the above constrained minimization problem can be converted into an unconstrained minimization problem with the new objective function given by:

$$\mathcal{J}'=\mathcal{J}=\lambda_1\mathcal{F}\lambda_2\mathcal{T} \quad (13)$$

where $$\mathcal{F}=\hat{p}_1^T F_{0,1}\hat{p}_0 \text{ and } \mathcal{T}=\|\hat{p}_2-\psi(\hat{p}_0, \hat{p}_1)\|^2.$$

Define $\Delta p_i$(i=0, 1, 2) as $$\Delta p_i=p_i-\hat{p}_i, \quad (14)$$

then $$\hat{p}_i=p_i-\Delta p_i, \text{ or } \tilde{p}_i=\tilde{p}_i-\Delta\tilde{p}_i.$$

Referring to Eq. (8) for $\breve{p}$.

If the second order term is neglected, the constraint of Eq. (11) becomes $\mathcal{F}=0$, with $$\mathcal{F}\approx\tilde{p}_1^T F_{0,1}\tilde{p}_0-\Delta\breve{p}_1^T F_{0,1}\tilde{p}_0-\tilde{p}_1^T F_{0,1}\Delta\tilde{p}_0 \quad (15)$$

$$=\tilde{p}_1^T F_{0,1}\tilde{p}_0-\Delta p_1^T Z^T F_{0,1}\tilde{p}_0-\tilde{p}_1^T F_{0,1}Z\Delta p_0.$$

Here, the equation $\breve{p}=Zp$ is used. The constraint of Eq. (12) becomes $$\mathcal{T}=\|p_2-\Delta p_2-\psi(p_0-\Delta p_0, p_1-\Delta p_1)\|^2 \quad (16)$$

By applying a Taylor expansion and keeping the first order terms:

$$\psi(p_0-\Delta p_0, p_1-\Delta p_1) \approx \psi(p_0, p_1) - \Psi_0 \Delta p_0 - \Psi_1 \Delta p_1 \quad (17)$$

where $$\Psi_i \partial \psi(p_0, p_1)/\partial p_i.$$

Equation (16) then becomes $\mathcal{T}=0$, with $$\mathcal{T} \approx \|p_2 - \Delta p_2 - \psi(p_0, p_1) + \Psi_0 \Delta p_0 + \Psi_1 \Delta p_1\|^2 \quad (18)$$
$$\approx a^T a + 2a^T \Psi_0 \Delta p_0 + 2a^T \Psi_1 \Delta p_1 - 2a^T \Delta p_2$$

where $a=p_2-\psi(p_0, p_1)$, and the second approximation in Eq. (18) is achieved by only keeping first order items.

To minimize $\mathcal{J}'$ in Eq. (13), let its first-order derivatives with respect to $\Delta p_i$ be zero, which yields $$\frac{\partial \mathcal{J}'}{\partial \Delta p_0} = 2\Delta p_0 - \lambda_1 Z^T F_{0,1}^T \tilde{p}_1 + 2\lambda_2 \Psi_0^T a$$

$$\frac{\partial \mathcal{J}'}{\partial \Delta p_1} = 2\Delta p_1 - \lambda_1 Z^T F_{0,1} \tilde{P}_0 + 2\lambda_2 \Psi_1^T a$$

$$\frac{\partial \mathcal{J}'}{\partial \Delta p_2} = 2\Delta p_2 - 2\lambda_2 a.$$

This gives $$\Delta p_0 = \frac{1}{2}\lambda_1 Z^T F_{0,1}^T \tilde{p}_1 - \lambda_2 \Psi_0^T a \quad (19)$$

$$\Delta p_1 = \frac{1}{2}\lambda_1 Z^T F_{0,1} \tilde{p}_0 - \lambda_2 \Psi_1^T a \quad (20)$$

$$\Delta p_2 = \lambda_2 a. \quad (21)$$

Substituting them into the linearized constraints of Eqs. (15) and (18) gives $$g_1 - \lambda_1 g_2/2 + \lambda_2 g_3 = 0 \quad (22)$$

$$g_4 + \lambda_1 g_3/2 - \lambda_2 g_5 = 0 \quad (23)$$

where $$g_1 = \tilde{p}_1^T F_{0,1} \tilde{p}_0 \quad (24)$$

$$g_2 = \tilde{p}_0^T F_{0,1}^T ZZ^T F_{0,1} \tilde{p}_0 + \tilde{p}_1^T F_{0,1} ZZ^T F_{0,1}^T \tilde{p}_1 \quad (25)$$

$$g_3 = a^T \Psi_1 Z^T F_{0,1} \tilde{p}_0 + \tilde{p}_1^T F_{0,1} Z \Psi_0^T a \quad (26)$$

$$g_4 = \tfrac{1}{2} a^T a \quad (27)$$

$$g_5 = a^T(I + \Psi_0 \Psi_0^T + \Psi_1 \Psi_1^T) a. \quad (28)$$

Thus, the solution for $\lambda_1$ and $\lambda_2$ is $$\lambda_1 = 2\frac{g_3 g_4 + g_1 g_5}{g_2 g_5 - g_3^2} \quad (29)$$

$$\lambda_2 = \frac{g_2 g_4 + g_1 g_3}{g_2 g_5 - g_3^2}. \quad (30)$$

Substituting the obtained $\lambda_1$, $\lambda_2$, $\Delta p_0$, $\Delta p_1$ and $\Delta p_2$ back into Eq. (13) finally gives $$\mathcal{J}' = \frac{1}{4}\lambda_1^2 g_2 - \lambda_1 \lambda_2 g_3 + \lambda_2^2 g_5 \quad (31)$$
$$= \frac{g_1^2 g_5 + g_2 g_4^2 + 2g_1 g_3 g_4}{g_2 g_5 - g_3^2}.$$

This is the new cost functional for a point match across three views. It is a function of the motion parameters, but does not contain 3D structure parameters anymore.

2.3. Simplifying the Two-View Cost Function

Consider now $$\min_{Q_k} \sum_{i=1}^{2} \|q_{i,k} - \phi(M_i, Q_k)\|^2 \quad (32)$$

in Eq. (4). To simplify the notation, the subscript k is dropped. Following the same idea as in the last subsection, this is equivalent to estimating $\hat{q}_1$ and $\hat{q}_2$ by minimizing the following objective function $$\mathcal{L} = \|q_1 - \hat{q}_1\|^2 + \|q_2 - \hat{q}_2\|^2 \quad (33)$$

subject to $\hat{q}_2^T F_{1,2} \hat{q}_1 = 0 \quad (34)$ where the fundamental matrix $F_{1,2}$ is defined as in section 2.1.

Define $\Delta q_1 = q_1 - \hat{q}_1$ and $\Delta q_2 = q_2 - \hat{q}_2$. Linearize the constraint of Eq. (34) as in Eq. (15). Using the Lagrange multiplier technique, the above constrained minimization problem can be transformed into an unconstrained one:

$$\mathcal{L}' = \Delta q_1^T \Delta q_1 + \Delta q_2^T q_2 + \lambda(\tilde{q}_2^T F_{1,2} \tilde{q}_1 - \Delta q_2^T Z^T F_{1,2} \tilde{q}_1 - \tilde{q}_2^T F_{1,2} Z \Delta q_1). \quad (35)$$

Letting the first-order derivatives be zero gives:

$$\Delta q_1 = \frac{\lambda}{2} Z^T F_{1,2}^T \tilde{q}_2$$

$$\Delta q_2 = \frac{\lambda}{2} Z^T F_{1,2} \tilde{q}_1$$

$$\lambda = 2\frac{\tilde{q}_2^T F_{1,2} \tilde{q}_1}{\tilde{q}_1^T F_{1,2}^T ZZ^T F_{1,2} \tilde{q}_1 + \tilde{q}_2^T F_{1,2} ZZ^T F_{1,2}^T \tilde{q}_2}.$$

Substituting them back into Eq. (35), after some simple algebra, gives:

$$\mathcal{L}' = \frac{(\tilde{q}_2^T F_{1,2} \tilde{q}_1)^2}{\tilde{q}_1^T F_{1,2}^T ZZ^T F_{1,2} \tilde{q}_1 + \tilde{q}_2^T F_{1,2} ZZ^T F_{1,2}^T \tilde{q}_2}. \quad (36)$$

This is the new cost functional for a point match only between two views. It is a function of the motion parameters, but does not contain any 3D structure parameters.

2.4. Summary

In summary, Eq. (4) becomes the following minimization problem:

$$\min_{M_2}\left(\sum_{j=1}^{M} \mathcal{J}'_j + \sum_{k=1}^{N} \mathcal{L}'_k\right), \quad (37)$$

where $\mathcal{J}'$ and $\mathcal{L}'$ are given by Eqs. (31) and (36). Notice that, using a first order approximation, the original large problem is transformed into a minimization over just the dimensional camera pose space.

In one embodiment of the present invention, the above technique is implemented using the conventional Levenberg-Marquardt algorithm. The initial guess at the minimum camera pose is obtained as follows. Only point matches across three views are used, and they are reconstructed in 3D space using points between the first and second view because their camera poses are known. Then, the camera pose for the third view is computed using 3D-2D correspondences. In both stages, a linear solution is started with, followed by a refining based on the distances between the observed image points and the predicted feature points.

3.0 Experimental Results

In this section, we provide experimental results with both synthetic (Sec. 3.1) and real data (Sec. 3.2 through Sec. 3.4). We consider a number of methods:

a) Method L: An implementation of the exact local bundle adjustment of Eq. (3) or more precisely Eq. (4), in which the independency of point structures (or equivalently the sparseness in the Jacobian and Hessian matrices) has been taken into account.

b) Method O: Our reduced local bundle adjustment of Eq. (37), where structure parameters have been eliminated.

c) Method I: The algorithm used to initialize our local bundle adjustment, as described in Sec. 2.4. Only matches shared by three views are used. This is similar to the approach of reference [1], except the re-projection errors, instead of algebraic errors, are used.

d) Method II: A two-view incremental algorithm. Motion is estimated only from point matches between the last two images, and the undetermined scale is computed using the common matches shared with those between the previous image pair.

e) Method B: A global bundle adjustment technique which gives the statistically optimal solution. The independency of point structures has been taken into account. The result obtained with Method O is used to initialize this method.

The above algorithms have been implemented with VC++, and all experiments reported in this section were conducted on a PC with a Pentium® III 850 MHz processor.

The synthetic data was used to compare Method O and Method L. It was generated from real data composed of a 3-image subsequence (i.e., the first 3 images of the STN31 sequence to be described shortly) in the following way. First, we reconstructed the 3D point for each track with the real feature points and camera motions. Second, original feature points in a track were replaced by the projected 2D points of the reconstructed 3D points. After this replacement, the camera motions and the 3D points in the real data became our ground truth.

Four real sequences named STN31, STN61, DYN40, and FRG21 were used in the experiments. STN61 is a 61-image sequence of a stone sculpture on a turntable, of which the rotation angle can be accurately controlled. STN31 is a 31-image sequence subsampled from the original STN61 sequence. Both STN31 and STN61 are closed-matches loop sequences, meaning that the first image and the last images coincide (i.e., their motion is zero). DYN40 is a 40-image sequence taken with a multi-camera rig. FRG21 is a 21-frame sequence taken by a hand held camera targeting a toy frog. The camera intrinsic parameters for STN31, STN61, and FRG21 were calibrated in advance, and those for DYN40 were self-calibrated and thus less accurate. While the algorithms tested in this section do not require any special motion sequences, we intentionally chose orbital or near orbital ones in order to make the experiment results easily interpretable.

With the real data, we compared methods O, I, II, and B. Section 3.2 gives detailed quantitative and visual comparisons of the four methods with help of some of STN31's properties. Section 3.3 shows the visual comparisons of Method O and Method B with the other three sequences. Section 3.4 presents the quantitative comparisons of the four methods in terms of the projection errors and running time.

3.1. Synthetic Data

Figure 3A:
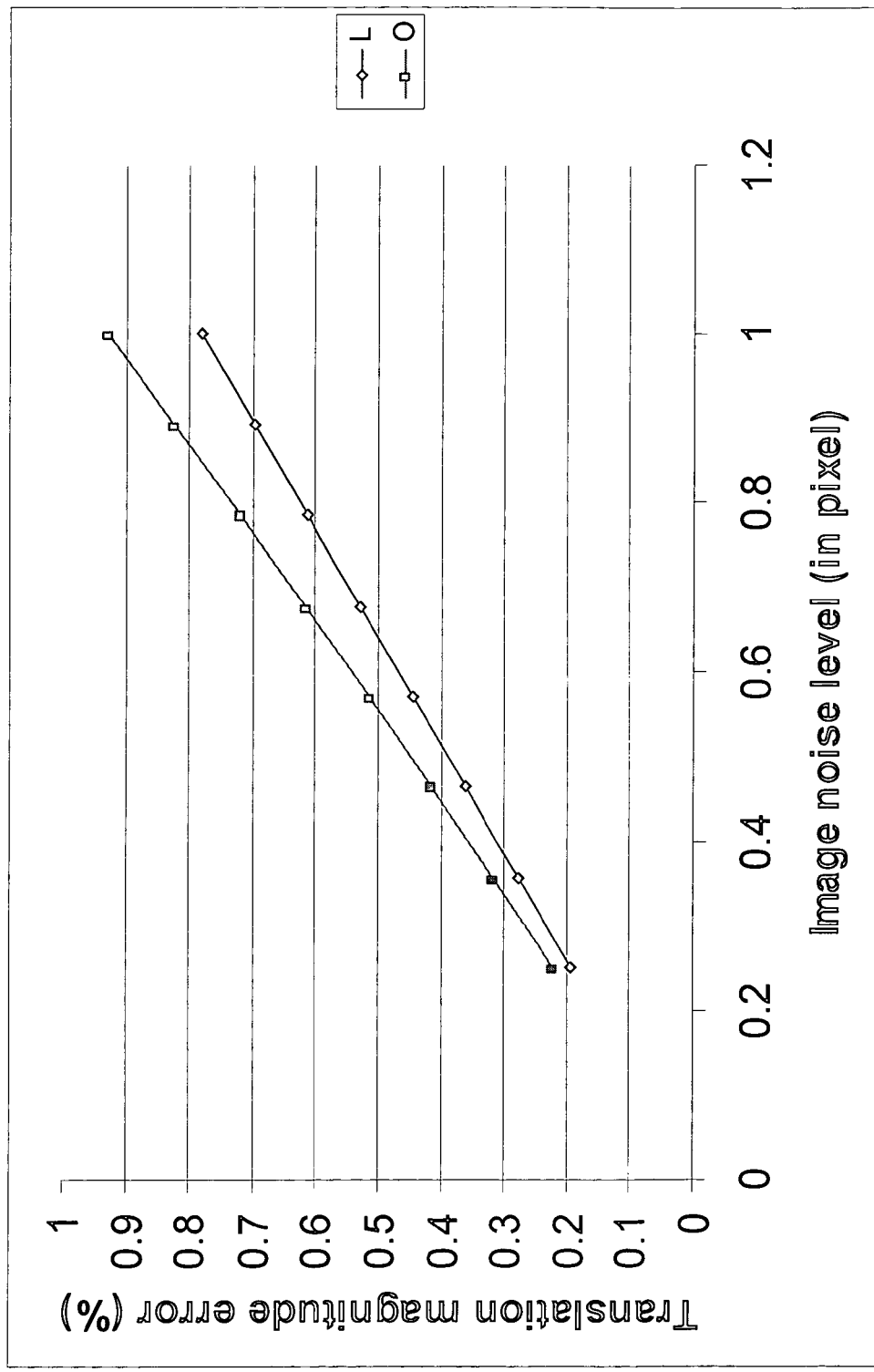
FIG. 3A is a graph plotting errors in the translation magnitude against the image noise level for two embodiments of the process of FIGS. 2A and 2B.
Figure 3B:
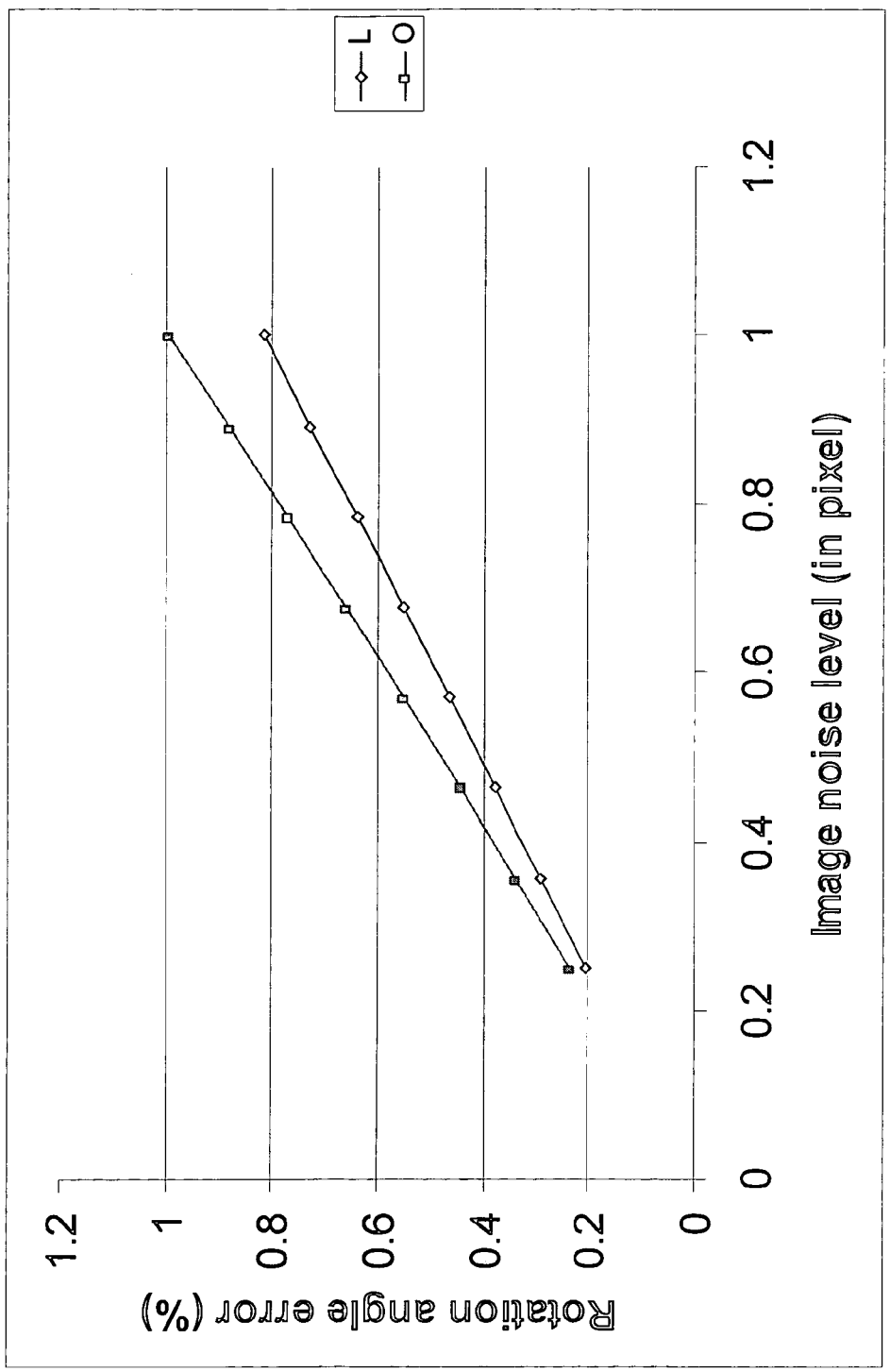
FIG. 3B is a graph plotting errors in the rotation angle against the image noise level for two embodiments of the process of FIGS. 2A and 2B.
Figure 4:
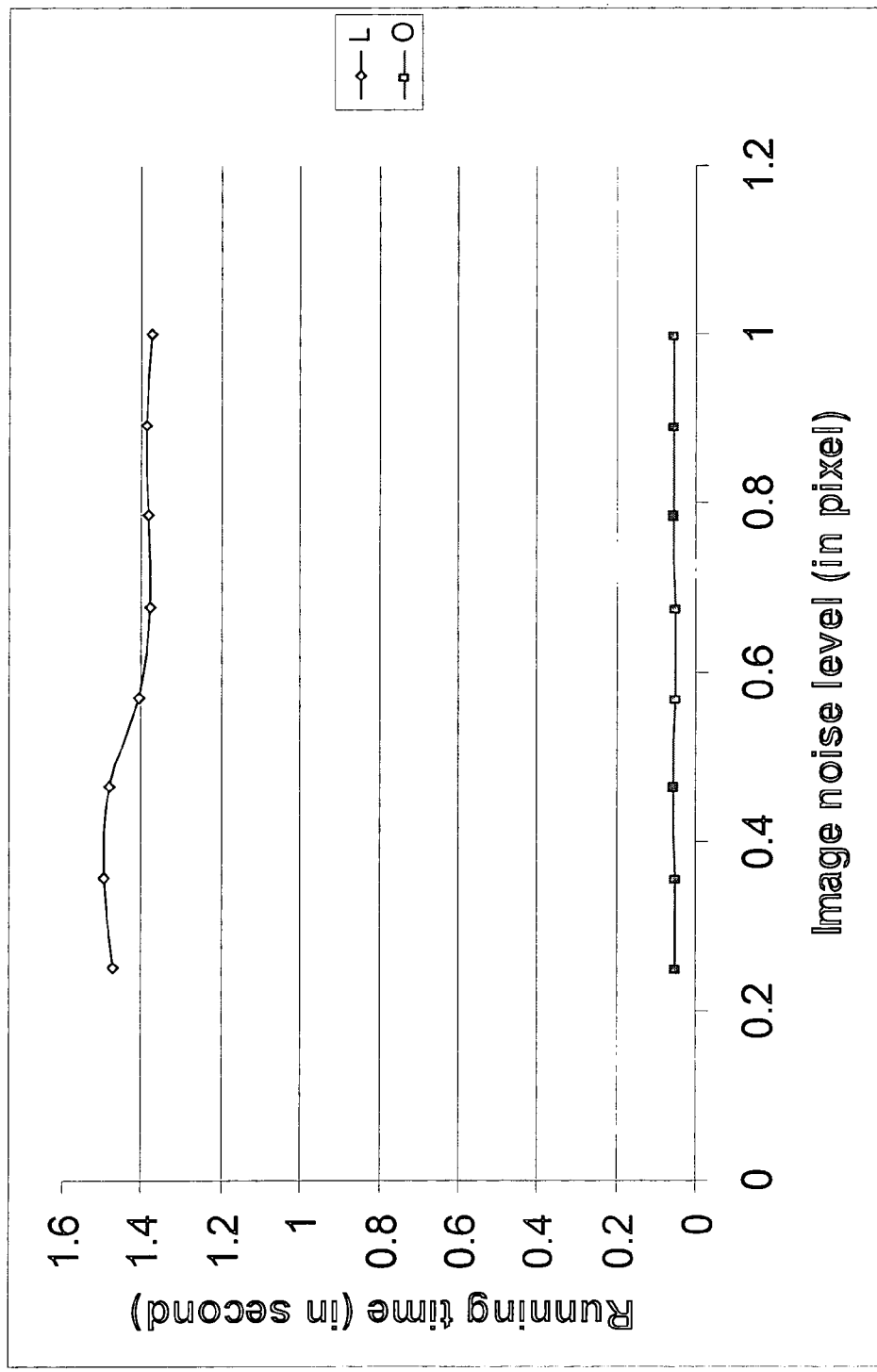
FIG. 4 is a graph plotting the running time against the image noise level for two embodiments of the process of FIGS. 2A and 2B.

We compared Method L and Method O with the synthetic data. There are about 200 points and the interframe rotation angle is about 12 degrees. The two methods are used to compute the third camera motion under different image noise levels. We used the relative rotation angle and the translation magnitude with respect to the ground truth as the error metrics of the estimated motion. At each image noise level, we run both methods 30 times, and the mean differences between the computed motion and the ground truth motion were recorded. Average running time was recorded in a similar way. FIGS. 3A and 3B show the translation magnitude errors and the rotation errors, respectively, for both methods. We can see from the figure that the errors with Method O are only slightly higher than Method L. It is less than 0.2% larger even when noise with 1 pixel standard deviation was added. On the other hand, this accuracy has been achieved with 30 times less computational time as can be seen from FIG. 4. This shows that the mathematical procedure described in Sec. 2 to eliminate all structure parameters is indeed of benefit.

3.2. Ground Truths Comparisons

The STN31 sequence is used next. There are several things we know for sure, within the control accuracy offered for our turntable, about the STN31 sequence. First, the camera is moving on a circle and the camera motion of the first image is overlapped with the last one. Second, the relative rotation angle and translation vector between two consecutive images are the same throughout the sequence. We also roughly know that relative rotation angle is around 12.414 degrees, and the rotation axis is close to [0, 1, 0]. The results are listed in the ground truth comparison table shown in FIG. 5, where a is the mean rotation angle between successive pairs of frames (in degrees), $\sigma_\alpha$ is the sample deviation of $\alpha$, $\bar{r}$ is the mean rotation axis (in the order of x, y, and z), $\bar{t}$ is the mean translation vector, and $\sigma_t$ are the square roots of the diagonal elements of the covariance matrix of the translation. It can be seen from the table that the proposed method is superior to both Method I and Method II in terms of the accuracy of both rotation angle and translation vector, e.g., it has smaller $\sigma_\alpha$ and $\sigma_t$. On the other hand, the results of our method are in general very close to those given by the global bundle adjustment method.

Figures 6A, 6B:
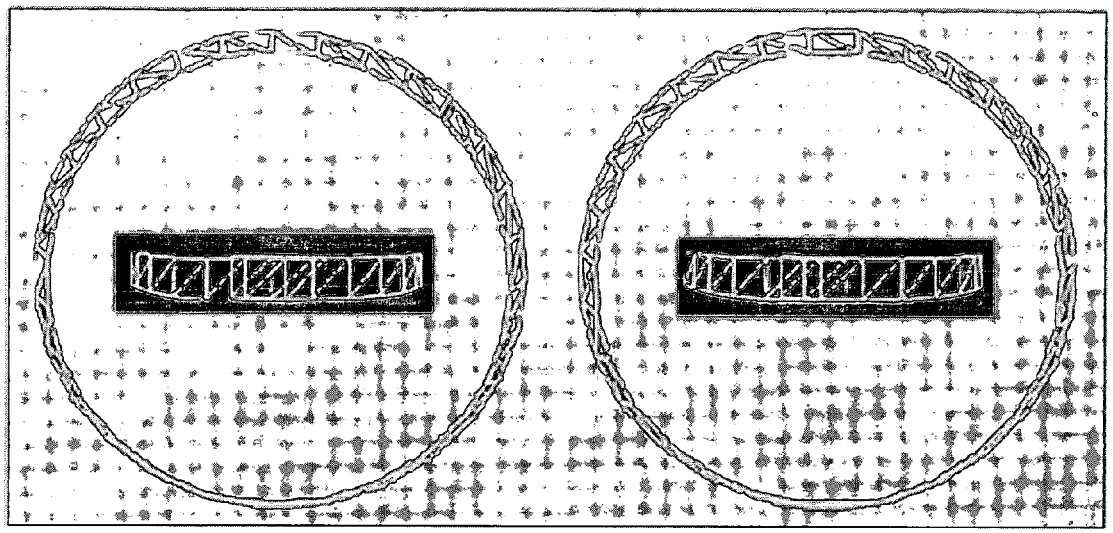
FIGS. 6A through 6D are images showing a visual comparison of the estimated camera motions estimated from the images of the STN31 sequence, where Method B was employed to estimate the camera motions depicted in FIG. 6A, Method O was used to estimate the camera motions depicted in FIG. 6B, Method I was used to estimate the camera motions depicted in FIG. 6C and Method II was used to estimate the camera motions depicted in FIG. 6D. The small images with black backgrounds shown in each of the figures depict that portion where the start and end of the sequence meet, from a frontal direction. In addition, each plane in the figures represents a focal plane, of which the center is the optical center of the camera and the normal is the direction of the optical axis.
Figures 6C, 6D:
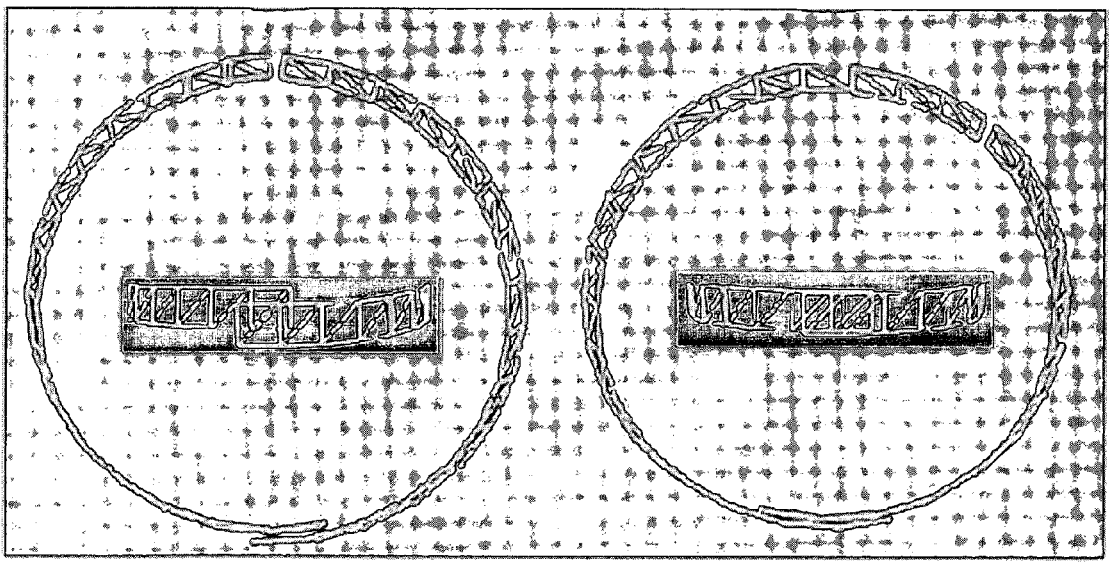

FIGS. 6A through 6D show the visual comparison of the estimated camera motions for the STN31 sequence, where Method B was employed to estimate the camera motions depicted in FIG. 6A, Method O was used to estimate the camera motions depicted in FIG. 6B, Method I was used to estimate the camera motions depicted in FIG. 6C and Method II was used to estimate the camera motions depicted in FIG. 6D. The small images with black backgrounds shown in each of the figures depict that portion where the start and end of the sequence meet, from a frontal direction. In addition, each plane in the figures represents a focal plane, of which the center is the optical center of the camera and the normal is the direction of the optical axis. The absolute size of the plane is not meaningful and has been properly adjusted for display purposes. According to the first ground truth mentioned earlier, the focal plane arrays should form a closed circle if the camera motions are computed correctly. This conforms quite well with the results of both our method and the bundle adjustment, with the exception that the overlapping between the first focal plane and the last one is a little bit overhead (see the small black images in the figure for details). This reveals that accumulation error is inevitable in both cases. Note that we did not use the knowledge that the last image is the same as the first image. Obviously, the results with the other two methods are much less accurate.

3.3. Visual Comparisons with Bundle Adjustment

Figures 7A, 7B:
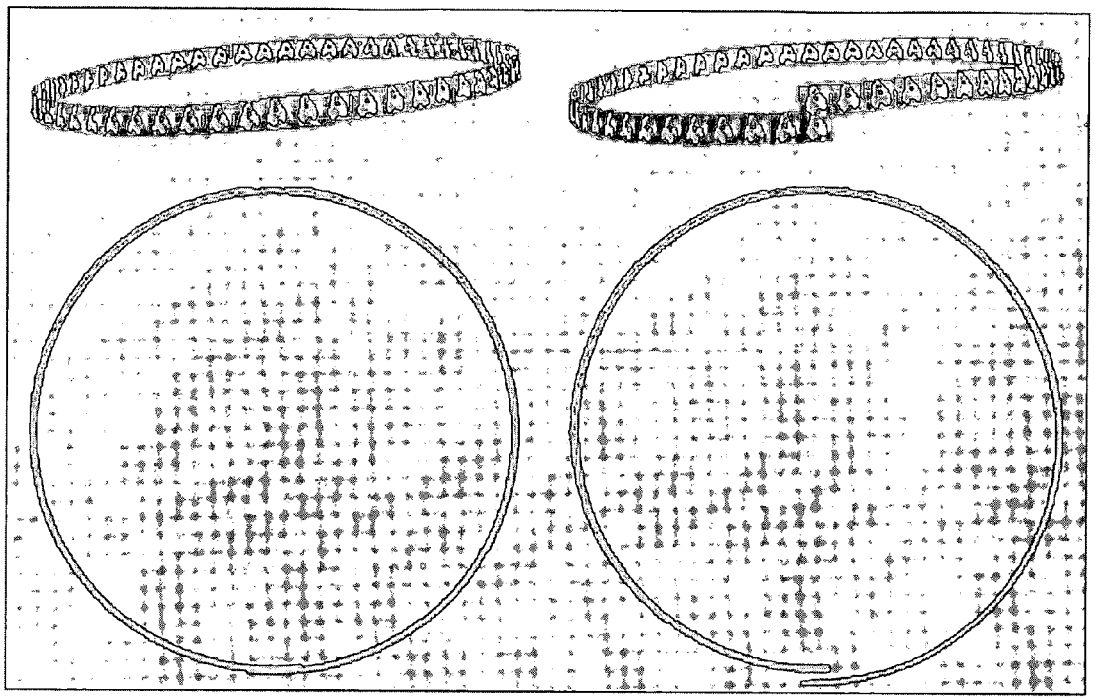
FIGS. 7A and 7B are images showing a visual comparison of the camera motions estimated from the images of the STN61 sequence, where
Figures 9A, 9B, 9C:
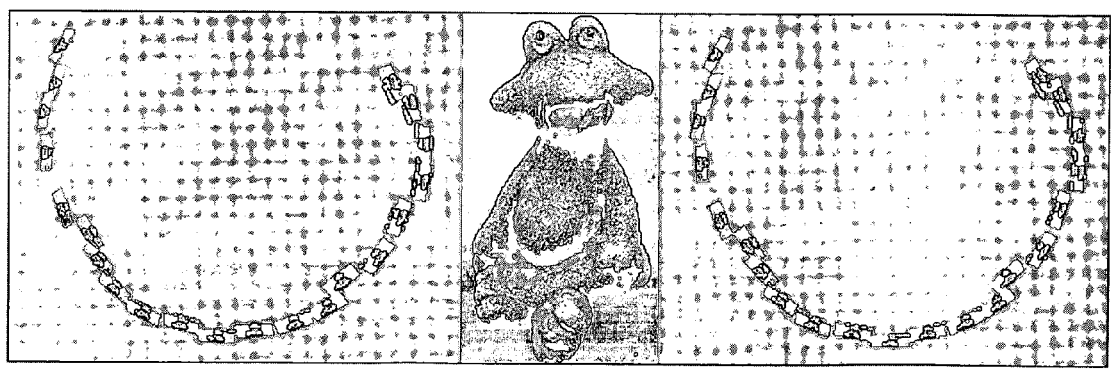
FIGS. 9A through 9C are images showing a visual comparison of the camera motions estimated from the images of the FRG21 sequence, where
Figure 8A:
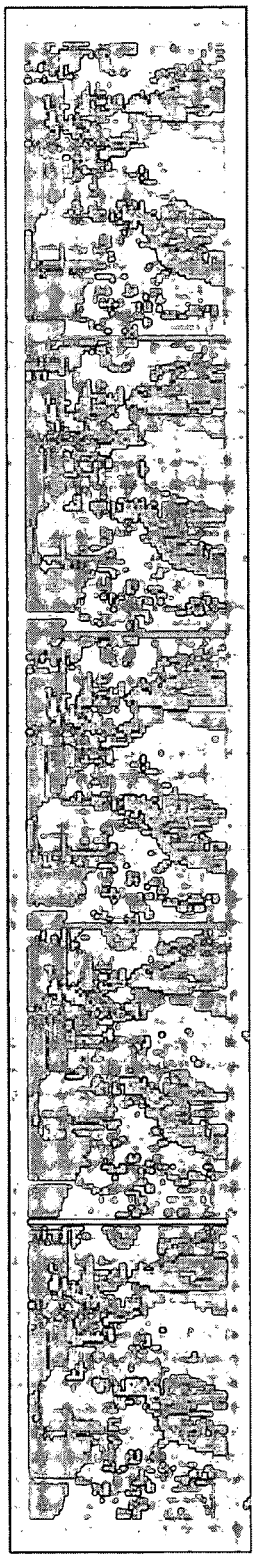
FIGS. 8A through 8C are images showing a visual comparison of the camera motions estimated from the images of the DYN40 sequence, where
Figure 8B:
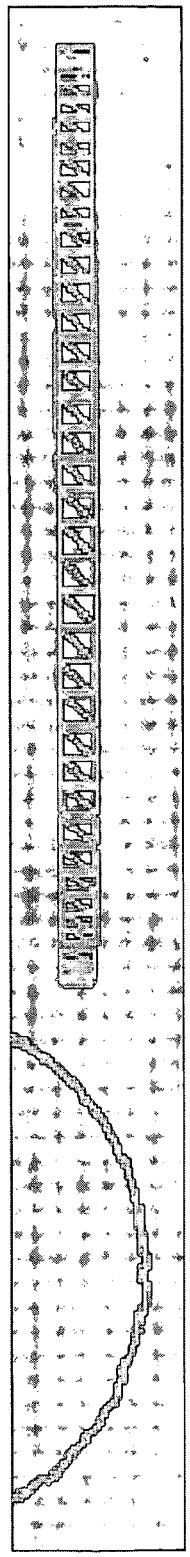
Figure 8C:
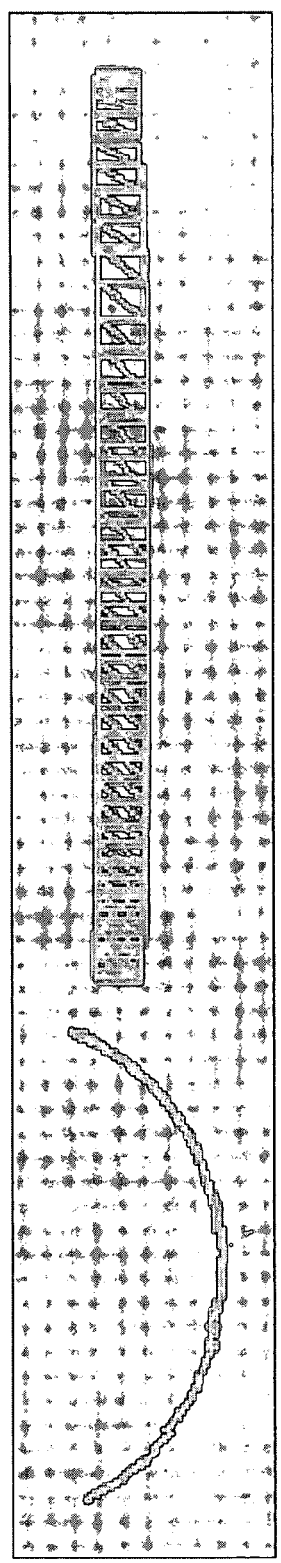

This subsection concentrates on the visual comparison of our method against the results of the global bundle adjustment procedure using the remaining three real image sequences. In brief, FIGS. 7A and 7B, FIGS. 8A through 8C, and FIGS. 9A through 9C show the results of STN61, DYN40, and FRG21, respectively. Specifically, FIG. 7A shows a side and top view of the results obtained using global bundle adjustment, and FIG. 7B is a side and top view of the results obtained using Method O, employing the STN61 sequence as an input. FIG. 8A depicts sample images from the DYN40 input sequence, and FIGS. 8B and 8C each show top and front views of the results obtained using global bundle adjustment and Method O, respectively. FIG. 9A shows a top view of the results obtained using Method O, and FIG. 9C is a side and top view of the results obtained using global bundle adjustment, employing the FRG21 sequence as an input. FIG. 9B shows a sample image of the sequence. Together with FIGS. 6A through 6D, the foregoing figures will be used as the complementary results for the quantitative comparisons in the next subsection.

3.4. Comparisons on Projection Errors and Running Time

We now compare the different methods in terms of the projection errors and running time. The projection errors were computed from a tracked feature table and the camera motions. The tracked feature table contains a list of feature tracks. Each track is a list of 2D point features that are shared by different views. The camera motions were computed with four different methods (i.e., I, II, O and B) as described above. The camera motions were used to reconstruct optimal 3D points from the tracked feature table. These 3D points were then projected to the images to compute the projection errors for the whole sequence. Since the tracked feature table is the same for all methods, the method that produces good motions will have a small projection error. The number of 2D points in the tracked feature tables are 7990, 26890, 11307, and 6049 for the STN31, STN61, DYN40, and FRG21, respectively. The results of this analysis are provided in the projection error and running time table shown in FIG. 10. The projection errors are displayed in the top of each cell of the table. The error used here is the root mean square error in pixels. The running time (in seconds) of each method is displayed under each corresponding projection error. The numbers below the sequence names are the estimated average rotation angle between two successive frames. For example, the rotation angle between two successive frames in DYN40 is only about 2.89 degrees.

Several observations can be made from the projection error and running time table. As compared with the other two local processes, the proposed method is in general more accurate. It is slower than Method I but is much faster than Method II. For the DYN40 sequence, the relative rotation angle is small and camera intrinsic parameters are less accurate than in other sequences. Method I failed in the middle of the sequence because errors accumulated from the previous frames became too large to obtain usable 3D reconstruction for pose determination. Our method, however, can significantly improve each local initial guess (from three views) from Method I and give a reasonable result for the whole sequence. This demonstrated the robustness of our method. When compared with the classical bundle adjustment algorithm, our method can give very similar results. This is true especially when the rotation angle is relatively large. Similar observations can also be made by inspecting the visual comparison results from FIGS. 6A through 6D, FIGS. 7A and 7B, FIGS. 8A through 8C, and FIG. 9A through 9C. More importantly, our method has almost linear computational complexity with respect to the number of images inside the sequence. This can be seen from the STN31 and STN61 experiments, where the running time was doubled (5.250/2.578=2.04) when the number of frames increased from 31 to 61. On the contrary, the classical bundle adjustment algorithm was almost 8 times slower when dealing with a sequence only twice longer.

4. Additional Embodiments

While the invention has been described in detail by specific reference to preferred embodiments thereof, it is understood that variations and modifications thereof may be made without departing from the true spirit and scope of the invention. For example, there are two more sets of point matches between the each triplet of images in the input sequence not considered in the foregoing description. One is those matches is only between images $I_{i-2}$ and $I_{i-1}$. However, this set of point matches does not contribute to the estimation of motion $M_i$, and so provides no additional useful data. The other unconsidered set of point matches is those existing only between $I_{i-2}$ and $I_i$. This latter set of point matches can contribute to the estimation of motion $M_i$, and if considered could add to the accuracy of the estimate for the camera pose parameters associated with $I_i$. Essentially, all this would entail is additionally identifying the point matches existing only between $I_{i-2}$ and $I_i$ in each triplet of images and adding a term to Eq. (3) as follows:

$$\min_{M_2, \{P_j\}, \{Q_k\}, \{L_l\}} \left( \sum_{j=1}^{M} \sum_{i=0}^{2} \|p_{i,j} - \phi(M_i, P_j)\|^2 + \sum_{k=1}^{N} \sum_{i=1}^{2} \|q_{i,k} - \phi(M_i, Q_k)\|^2 + \sum_{l=1}^{O} \sum_{i \in \{0,2\}} \|I_{i,l} - \phi(M_i, L_l)\|^2 \right) \quad (38)$$

where the additional set of point matches existing only between $I_0$ and $I_2$ is denoted by $\{(I_{0,l}, I_{2,l}) | l=1, \ldots, O\}$ and $L_l$ is the 3D point corresponding to the pair point match $(I_{0,l}, I_{2,l})$. Similarly, the two-view cost function associated the point correspondences between $I_0$ and $I_2$ can be simplified in the same way described in Section 2.3 in connection with the two-view cost function associated the point correspondences between $I_1$ and $I_2$ (see Eq. (36)). Namely, the simplified two-view cost function associated with each point correspondence between $I_0$ and $I_2$ is denoted as:

$$S' = \frac{(\tilde{I}_2^T F_{0,2} \tilde{I}_0)^2}{\tilde{I}_0^T F_{0,2}^T ZZ^T F_{0,2} \tilde{I}_0 + \tilde{I}_2^T F_{0,2} ZZ^T F_{0,2}^T \tilde{I}_2} \quad (39)$$

Thus, Eq. (37) would be modified as follows:

$$\min_{M_2} \left( \sum_{j=1}^{M} J'_j + \sum_{k=1}^{N} L'_k + \sum_{l=1}^{O} S'_l \right) \quad (40)$$

5. References

[1] S. Avidan and A. Shashua. Threading fundamental matrices. In *Proc. 5th European Conf. Computer Vision*, volume I, pp. 124-140, 1998.
[2] A. Fitzgibbon and A. Zisserman. Automatic camera recovery for closed or open image sequences. In *Proc. 5th European Conf. Computer Vision*, 1998.
[3] C. Harris and M. Stephens. A combined corner and edge detector. In *Proc. 4th Alvey Vision Conf.*, pp. 189-192, 1988.
[4] P. Beardsley, P. Torr, and A. Zisserman. 3D model acquisition from extended image sequences. In *Proc. 4th European Conf. Computer Vision*, pp. 683-695, 1996.
[5] P. McLauchlan and D. Murray. A unifying framework for structure and motion recovery from image sequences. In *Proc. Fifth Int'l Conf. Computer Vision*, pp. 314-320, 1995.
[6] J. Shi and C. Tomasi. Good features to track. In *Proc. Conf Computer Vision and Pattern Recognition*, pp. 593-600, Seattle, Wash., 1994.
[7] Z. Zhang, R. Deriche, O. Faugeras, and Q.-T. Luong. A robust technique for matching two uncalibrated images through the recovery of the unknown epipolar geometry. *Artificial Intelligence Journal*, 78:87-119, October 1995.
[8] B. Triggs, P. McLauchlan, R. Hartley, and A. Fitzgibbon. Bundle adjustment—a modern synthesis. In *Proc. Int'l Workshop Vision Algorithms: Theory and Practice*, pp. 298-372, 1999.

Wherefore, what is claimed is:

1. A computer-implemented incremental motion estimation process for estimating camera pose parameters associated with each of a sequence of images of a scene, comprising:
    a first establishing step for establishing a set of triple matching points that depict the same point in the scene across three successive images of each triplet of images that can be formed from the sequence;
    a second establishing step for establishing a set of dual matching points that depict the same point in the scene across the latter two images of each triplet of images that can be formed from the sequence;
    a defining step for defining camera coordinate system associated with the first image in the sequence as coinciding with a 3D world coordinate system for the scene depicted in the sequence of images;
    a third establishing step for estimating the camera pose parameters associated with the second image in the sequence; and
    for each successive triplet of images formable from the sequence starting with the first three images, an estimating step for estimating the camera pose parameters associated with the third image of each triplet from previously-ascertained camera pose parameters associated with the first two images in the triplet, as well as the dual and triple matching points of the triplet, said estimating step comprising, a computing step for computing the camera pose parameters associated with the third image in the triplet under consideration which will result in a minimum value for a sum of the squared differences between the image coordinates of each identified triple match point and its corresponding predicted image coordinates in each of the three images in the triplet, added to a sum of the squared differences between the image coordinates of each identified dual match point and its corresponding predicted image coordinates in each of the latter two images in the triplet.

2. The process of claim 1, wherein the predicted image coordinates of either a triple or dual matching point are characterized as a function of 3D world coordinates associated with the matching point under consideration and the camera pose parameters of the image containing this matching point, and wherein the estimating step further comprises a second computing step for computing the 3D world coordinates associated with each triple and dual match point in the triplet, as well as the camera pose parameters associated with the third image in the triplet under consideration, which will result in a minimum value for the sum of the squared differences between the image coordinates of each identified triple match point and its corresponding predicted image coordinates in each of the three images in the triplet, added to the sum of the squared differences between the image coordinates of each identified dual match point and its corresponding predicted image coordinates in each of the latter two images in the triplet.

3. A local bundling adjustment process for estimating the camera projection matrix associated with each of a sequence of images of a scene, comprising:
    an inputting step for inputting the sequence of images;
    an identifying step for identifying points in each image in the sequence of images;
    a determining step for determining which of the identified points depict the same point of the scene so as to be matching points, said determining step comprising,
        a first establishing step for establishing a set of triple matching points that depict the same point in the scene across the three successive images of each triplet of images that can be formed from the sequence, and
        a second establishing step for establishing a set of dual matching points that depict the same point in the scene across the latter two images of each triplet of images that can be formed from the sequence;
    a defining step for defining the camera coordinate system associated with the first image in the sequence as coinciding with a 3D world coordinate system for the scene depicted in the sequence of images;
    a first computing step for compute the camera projection matrix associated with the second image in the sequence; and
    for each successive triplet of images that can be formed from the sequence starting with the first three images, an estimating step for estimating the camera projection matrix of the third image of each triplet from previously-ascertained camera projection matrices associated with the first two images in the triplet as well as points determined to be matching points across all three images of the of the triplet and points determined to be matching points across at least one pair of images in the triplet, said estimating step comprising, a second computing step for computing the camera projection matrix associated with the third image in the triplet under consideration which will result in a minimum value for the sum of the squared differences between the image coordinates of each identified triple match point and its corresponding predicted image coordinates in each of the three images in the triplet, added to the sum of the squared differences between the image coordinates of each identified dual match point and its corresponding predicted image coordinates in each of the latter two images in the triplet.

* * * * *